(12) United States Patent
Luo et al.

(10) Patent No.: US 12,406,322 B2
(45) Date of Patent: Sep. 2, 2025

(54) CASTING CONTROL METHOD AND APPARATUS

(71) Applicant: Huawei Technologies Co., Ltd., Shenzhen (CN)

(72) Inventors: Cheng Luo, Wuhan (CN); Changliang Wang, Hangzhou (CN); Xiaofei Zhong, Wuhan (CN); Gang Li, Wuhan (CN); Ruoxi Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 18/188,876

(22) Filed: Mar. 23, 2023

(65) Prior Publication Data

US 2023/0230196 A1    Jul. 20, 2023

Related U.S. Application Data

(63) Continuation of application No. PCT/CN2021/114438, filed on Aug. 25, 2021.

(30) Foreign Application Priority Data

Sep. 25, 2020  (CN) .......................... 202011027392.2

(51) Int. Cl.
*G06T 1/20* (2006.01)
*H04L 65/65* (2022.01)
*H04N 7/01* (2006.01)
*H04N 19/42* (2014.01)

(52) U.S. Cl.
CPC ................. *G06T 1/20* (2013.01); *H04N 7/01* (2013.01); *H04N 19/42* (2014.11); *H04L 65/65* (2022.05)

(58) Field of Classification Search
CPC . G06T 1/20; H04N 19/42; H04N 7/01; H04L 65/65
See application file for complete search history.

(56) References Cited

U.S. PATENT DOCUMENTS

| 11,036,458 | B2 * | 6/2021 | Schmidt ................. G06F 3/165 |
| 2014/0362096 | A1 | 12/2014 | Otsuka | |
| 2016/0188279 | A1 * | 6/2016 | Rajamani ............... G09G 5/026 345/2.3 |
| 2016/0350056 | A1 * | 12/2016 | Makar ................... G06F 3/1454 |
| 2022/0139352 | A1 * | 5/2022 | Hu ......................... G06T 11/60 345/204 |

FOREIGN PATENT DOCUMENTS

CN    103402100 A  * 11/2013

OTHER PUBLICATIONS

Tu Sheng; Xing Daming, Machine translation of CN-103402100-A (Year: 2013).*

* cited by examiner

*Primary Examiner* — Kee M Tung
*Assistant Examiner* — Xiaoming Wei
(74) *Attorney, Agent, or Firm* — Slater Matsil, LLP

(57) ABSTRACT

A casting control method and apparatus are provided. The casting control method and apparatus are applied to the field of video processing technologies. The method is applied to a first electronic device. The first electronic device includes a GPU and an HWC. When the first electronic device is in a casting state, the to-be-synthesized layer can be separately sent to the GPU and the HWC if the video security layer is not included. The first electronic device synthesizes the to-be-synthesized layer in parallel by using the GPU and the HWC.

20 Claims, 7 Drawing Sheets

CASTING CONTROL METHOD AND APPARATUS

CROSS-REFERENCE TO RELATED APPLICATIONS

This application is a continuation of International Application No.PCT/CN2021/114438, filed on Aug. 25, 2021, which claims priority to Chinese Patent Application No. 202011027392.2, filed on Sep. 25, 2020. The disclosures of the aforementioned applications are hereby incorporated by reference in their entireties.

TECHNICAL FIELD

Embodiments of this application relate to the field of terminal technologies, and in particular, to a casting control method and apparatus.

BACKGROUND

With development of Internet technologies, a casting technology is widely applied. Casting is to cast a multimedia file of a device A to a device B, so that the device B can also synchronously display the multimedia file displayed by the device A. In the casting technology, a multimedia file of a device (for example, a mobile phone or a tablet computer) with a small display may be cast to a large-screen display device (for example, a television or a vehicle-mounted multimedia display), to achieve a better viewing effect and facilitate sharing of the multimedia file with a plurality of persons.

In the conventional technology, a screen mirroring casting manner is usually used. To be specific, all content of a multimedia file displayed by a device A (namely, a casting device) is completely cast to a device B (namely, a display device), so that content displayed by the device B is the same as content displayed by the device A. Specifically, after the device A synthesizes, by using a graphics processing unit (GPU), data to be displayed on the device B, and sends the data to the device B, the device A synthesizes, by using a hardware composer (HWC), data to be displayed on the device A, to complete casting.

However, in the foregoing casting manner, casting efficiency is low.

SUMMARY

Embodiments of this application provide a casting control method and apparatus, to improve layer synthesis efficiency, and further improve multimedia information casting efficiency.

According to a first aspect, an embodiment of this application provides a casting control method, applied to a first electronic device. The first electronic device includes a graphics processing unit (GPU) and a hardware composer (HWC). The method includes: when the first electronic device is in a casting state, determining whether a to-be-synthesized layer corresponding to multimedia information to be cast and displayed includes a video security layer; separately sending the to-be-synthesized layer to the GPU and the HWC if the video security layer is not included; synthesizing the to-be-synthesized layer in parallel by using the GPU and the HWC, and sending a first layer synthesized by the GPU to a second electronic device, to display the multimedia information corresponding to the first layer on the second electronic device; and displaying the multimedia information corresponding to a second layer synthesized by the HWC.

In this solution, when the to-be-synthesized layer corresponding to the multimedia information to be cast and displayed does not include the video security layer, the to-be-synthesized layer may be synthesized in parallel by using the GPU and the HWC, to improve layer synthesis efficiency and further improve multimedia information casting efficiency.

In a possible implementation, a format of the first layer is a first data format, and a data amount of data in the first data format is less than a data amount of data in an RGBA8888 format.

In this solution, because the data amount of the data in the first data format is less than the data amount of the data in the RGBA8888 format, a data transmission amount can be reduced, data transmission efficiency can be improved, storage efficiency can be optimized, and display bandwidth can be reduced.

In a possible implementation, the first data format is YUV420sp.

In this solution, because a data amount of data in the YUV420sp format is less than the data amount of the data in the RGBA8888 format, a data transmission amount can be reduced, and data transmission efficiency can be improved.

In a possible implementation, the sending a first layer synthesized by the GPU to a second electronic device includes: encoding the first layer, to obtain an encoded layer; packing the encoded layer based on a real-time transport protocol (RTP) or an RTP control protocol RTCP; and sending a layer obtained after packing processing to the second electronic device.

In this solution, the first electronic device encodes and compresses the first layer, and performs RTP or RTCP packing processing on the encoded layer, to send the layer obtained after packing processing to the second electronic device. In this way, not only layer data security can be improved, but also a data transmission amount can be reduced, and data transmission efficiency can be improved.

In a possible implementation, the sending a layer obtained after packing processing to the second electronic device includes: sending, based on a transmission control protocol TCP or a user datagram protocol (UDP), the layer obtained after packing processing to the second electronic device.

In a possible implementation, determining that the first electronic device is in the casting state includes: determining whether a virtual screen creation method and an encoder creation method are invoked; and if it is determined that the virtual screen creation method and the encoder creation method are invoked, determining that the first electronic device is in the casting state.

In this solution, whether the first electronic device is in the casting state is determined by determining whether the virtual screen creation method and the encoder creation method are invoked, to improve efficiency and accuracy of determining the casting state.

According to a second aspect, an embodiment of this application provides a casting control method, applied to a second electronic device. The method includes: receiving a first layer sent by a first electronic device, where the first layer is synthesized in parallel with a second layer when the first electronic device is in a casting state and it is determined that a to-be-synthesized layer corresponding to multimedia information to be cast and displayed does not include a video security layer, the first layer is synthesized by using a graphics processing unit GPU in the first electronic device, and the second layer is synthesized by using a hardware composer HWC in the first electronic device; parsing the first layer, to obtain the multimedia information; and displaying the multimedia information.

In this solution, when the to-be-synthesized layer corresponding to the multimedia information to be cast and displayed does not include the video security layer, the to-be-synthesized layer may be synthesized in parallel by using the GPU and the HWC, to improve layer synthesis efficiency and further improve multimedia information casting efficiency.

In a possible implementation, a format of the first layer is a first data format, and a data amount of data in the first data format is less than a data amount of data in an RGBA8888 format.

In this solution, because the data amount of the data in the first data format is less than the data amount of the data in the RGBA8888 format, a data transmission amount can be reduced, data transmission efficiency can be improved, storage efficiency can be optimized, and display bandwidth can be reduced.

In a possible implementation, the first data format is YUV420sp.

In this solution, because a data amount of data in the YUV420sp format is less than the data amount of the data in the RGBA8888 format, a data transmission amount can be reduced, and data transmission efficiency can be improved.

In a possible implementation, the parsing the first layer, to obtain the multimedia information includes: unpacking the first layer based on a real-time transport protocol RTP or an RTP control protocol RTCP; decoding a layer obtained after unpacking processing; and converting a format of a decoded layer from the first data format into the RGBA8888 format, to obtain the multimedia information.

In this solution, the second electronic device converts the format of the decoded layer from the first data format into the RGBA8888 format, to ensure that the multimedia information is correctly displayed.

In a possible implementation, the receiving data of a first layer sent by a first electronic device includes: receiving data of the first layer based on a transmission control protocol (TCP) or a user datagram protocol (UDP).

According to a third aspect, an embodiment of this application provides a casting control apparatus. The apparatus includes a graphics processing unit (GPU) and a hardware composer (HWC), and the apparatus includes: a processing unit, configured to: when the casting control apparatus is in a casting state, determine whether a to-be-synthesized layer corresponding to multimedia information to be cast and displayed includes a video security layer; a sending unit, configured to separately send the to-be-synthesized layer to the GPU and the HWC when the video security layer is not included, where the processing unit is further configured to synthesize the to-be-synthesized layer in parallel by using the GPU and the HWC; and the sending unit is further configured to send a first layer synthesized by the GPU to a second electronic device, to display the multimedia information corresponding to the first layer on the second electronic device; and a display unit, configured to display the multimedia information corresponding to a second layer synthesized by the HWC.

In a possible implementation, a format of the first layer is a first data format, and a data amount of data in the first data format is less than a data amount of data in an RGBA8888 format.

In a possible implementation, the first data format is YUV420sp.

In a possible implementation, the sending unit is specifically configured to: encode the first layer, to obtain an encoded layer; pack the encoded layer based on a real-time transport protocol (RTP) or an RTP control protocol (RTCP); and send a layer obtained after packing processing to the second electronic device.

In a possible implementation, the sending unit is specifically configured to send, based on a transmission control protocol (TCP) or a user datagram protocol (UDP), the layer obtained after packing processing to the second electronic device.

In a possible implementation, the processing unit is specifically configured to: determine whether a virtual screen creation method and an encoder creation method are invoked; and if it is determined that the virtual screen creation method and the encoder creation method are invoked, determine that the first electronic device is in the casting state.

According to a fourth aspect, an embodiment of this application provides a casting control apparatus, including: a receiving unit, configured to receive a first layer sent by a first electronic device, where the first layer is synthesized in parallel with a second layer when the first electronic device is in a casting state and it is determined that a to-be-synthesized layer corresponding to multimedia information to be cast and displayed does not include a video security layer, the first layer is synthesized by using a graphics processing unit GPU in the first electronic device, and the second layer is synthesized by using a hardware composer HWC in the first electronic device; a processing unit, configured to parse the first layer, to obtain the multimedia information; and a display unit, configured to display the multimedia information.

In a possible implementation, a format of the first layer is a first data format, and a data amount of data in the first data format is less than a data amount of data in an RGBA8888 format.

In a possible implementation, the first data format is YUV420sp.

In a possible implementation, the processing unit is specifically configured to: unpack the first layer based on a real-time transport protocol RTP or an RTP control protocol RTCP; decode a layer obtained after unpacking processing; and convert a format of a decoded layer from the first data format into the RGBA8888 format, to obtain the multimedia information.

In a possible implementation, the receiving unit is specifically configured to receive data of the first layer based on a transmission control protocol TCP or a user datagram protocol UDP.

According to a fifth aspect, an embodiment of this application provides a casting control apparatus. The apparatus includes a display, a processor, and a memory, the memory stores a computer program, and the processor executes the computer program stored in the memory, so that the apparatus performs the method according to the first aspect or the second aspect.

According to a sixth aspect, an embodiment of this application provides a communications apparatus, including a processor and an interface circuit. The interface circuit is configured to: receive a code instruction, and transmit the code instruction to the processor; and the processor is configured to run the code instruction, to perform the method according to the first aspect or the second aspect.

The apparatuses in the third aspect and the fourth aspect of this application each may be an electronic device, or may be a chip in the electronic device. The electronic device or the chip has a function of implementing the casting control method in any one of the foregoing aspects or the possible designs of the foregoing aspects. The function may be implemented by using hardware, or may be implemented by using hardware executing corresponding software. The hardware or the software includes one or more units corresponding to the foregoing function.

The electronic device includes a processing unit and a transceiver unit. The processing unit may be a processor, the transceiver unit may be a transceiver, and the transceiver includes a radio frequency circuit. Optionally, the electronic device further includes a storage unit, and the storage unit may be, for example, a memory. When the electronic device includes the storage unit, the storage unit is configured to store computer-executable instructions, the processing unit is connected to the storage unit, and the processing unit executes the computer-executable instructions stored in the storage unit, so that the electronic device performs the casting control method in any one of the foregoing aspects or the possible designs of the foregoing aspects.

The chip includes a processing unit and a transceiver unit. The processing unit may be a processor, and the transceiver unit may be an input/output interface, a pin, a circuit, or the like on the chip. The processing unit may execute computer-executable instructions stored in the storage unit, so that the chip performs the casting control method in any one of the foregoing aspects or the possible designs of the foregoing aspects. Optionally, the storage unit may be a storage unit (for example, a register or a cache) in the chip, or the storage unit may be a storage unit (for example, a read-only memory (ROM)) that is in a terminal device and that is located outside the chip, or another type of static storage device (for example, a random access memory (RAM)) that may store static information and instructions.

The processor may be a central processing unit (CPU), a microprocessor, or an application specific integrated circuit (ASIC), or may be one or more integrated circuits configured to control program execution of the casting control method in any one of the foregoing aspects or the possible designs of the foregoing aspects.

According to a seventh aspect, an embodiment of this application provides a readable storage medium, configured to store instructions. When the instructions are executed, the method according to the first aspect or the second aspect is implemented.

According to an eighth aspect, an embodiment of this application provides a computer program product including instructions. When the computer program product runs on a computer, the computer is enabled to perform the casting control method according to either of the first aspect and the second aspect of embodiments of this application.

According to the casting control method and apparatus provided in embodiments of this application, the method is applied to the first electronic device, and the first electronic device includes the GPU and the HWC. When the first electronic device is in the casting state, whether the to-be-synthesized layer corresponding to the multimedia information to be cast and displayed includes the video security layer is determined; the to-be-synthesized layer may be separately sent to the GPU and the HWC if the video security layer is not included; the to-be-synthesized layer is synthesized in parallel by using the GPU and the HWC, and the first layer synthesized by the GPU is sent to the second electronic device, to display the multimedia information corresponding to the first layer on the second electronic device; and the multimedia information corresponding to a second layer synthesized by the HWC is displayed. When the to-be-synthesized layer corresponding to the multimedia information to be cast and displayed does not include the video security layer, the to-be-synthesized layer may be synthesized in parallel by using the GPU and the HWC, to improve layer synthesis efficiency and further improve multimedia information casting efficiency.

DETAILED DESCRIPTION OF ILLUSTRATIVE EMBODIMENTS

In the specification, claims, and accompanying drawings of this application, the terms "first", "second", "third", and the like are intended to distinguish between different objects but not to limit a particular order.

In embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

For clear and brief description of the following embodiments, a brief description of a related technology is first provided.

Casting in embodiments of this application indicates that multimedia information (for example, audio, a video, or a picture) on a first electronic device is transmitted to a second electronic device for presentation, so that a plurality of electronic devices synchronously display same multimedia information. Casting in this application may include wired casting and wireless casting. Wired casting may be establishing a connection between the plurality of electronic devices through a high definition multimedia interface (HDMI), and transmitting the multimedia information through an HDMI transmission line. Wireless casting may be establishing a connection between the plurality of electronic devices based on a Miracast protocol, and transmitting the multimedia information through a local area network (LAN) or a wide area network (WAN).

Figure 1:
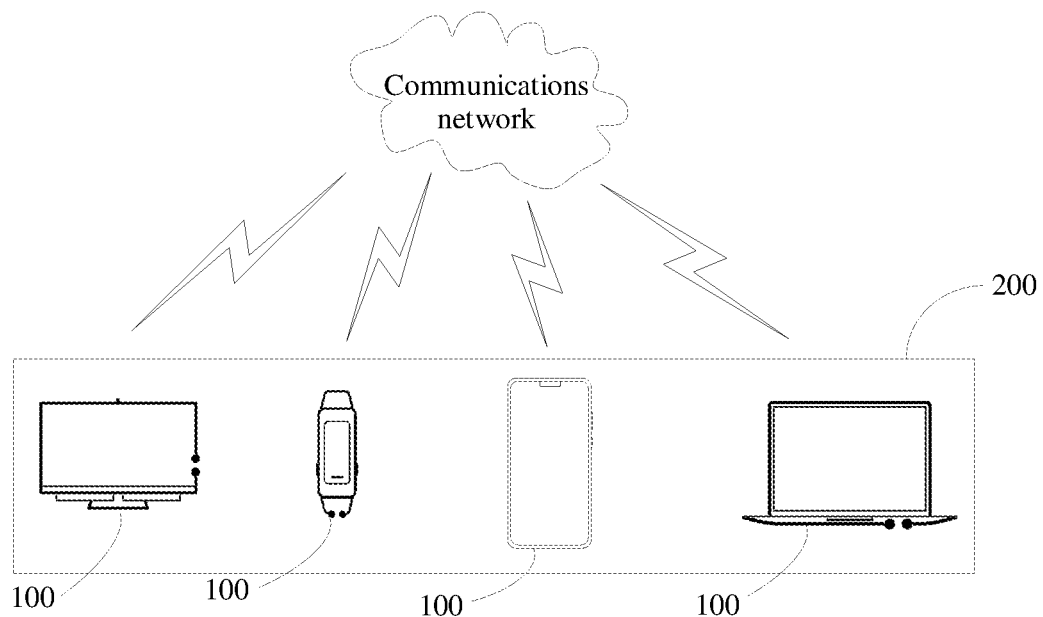
FIG. 1 is a schematic diagram of an architecture of an application scenario of a casting control method according to an embodiment of this application.

FIG. 1 is a schematic diagram of an architecture of an application scenario of a casting control method according to an embodiment of this application. As shown in FIG. 1, a casting control method provided in the following embodiments of this application may be applied to an electronic device group 200, electronic devices 100 in the electronic device group 200 may communicate with each other through a LAN or a WAN.

For example, a mobile phone, a tablet computer, a desktop computer, a smartwatch, and a notebook computer of a user may be used as the electronic device group 200. When the user logs in to a same account on the mobile phone, the tablet computer, the desktop computer, the smartwatch, and the notebook computer, the mobile phone, the tablet computer, the desktop computer, and the notebook computer may communicate with each other through the wide area network.

For another example, a mobile phone, a tablet computer, a desktop computer, a smartwatch, and a notebook computer of a user may be connected to a same router. In this case, the mobile phone, the tablet computer, the desktop computer, the smartwatch, and the notebook computer may form a local area network, and devices in the local area network may communicate with each other by using the router.

For another example, the electronic devices 100 may alternatively form a peer-to-peer network (which may also be referred to as a P2P network) in a wireless communication manner (for example, Bluetooth, wireless fidelity (Wi-Fi), or a ZigBee network). For example, a user may add a mobile phone, a tablet computer, a smartwatch, and a notebook computer to a Wi-Fi network whose name is "1234". All electronic devices 100 in the Wi-Fi network form a P2P network, and all devices in the P2P network are members in the electronic device group 200.

Certainly, the electronic devices 100 in the electronic device group 200 may alternatively be interconnected through a cellular network, or the electronic devices 100 may alternatively be interconnected through a transfer device (for example, a USB data cable or a Dock device), to implement a communication function between the electronic devices 100 in the electronic device group 200. This is not limited in this embodiment of the present invention.

In this embodiment of this application, one or more electronic devices 100 in the electronic device group 200 may be used as a source device, and one or more electronic devices 100 in the electronic device group 200 may be used as a destination device. The source device may cast display content in a display interface of the source device to the destination device for display.

Figure 2:
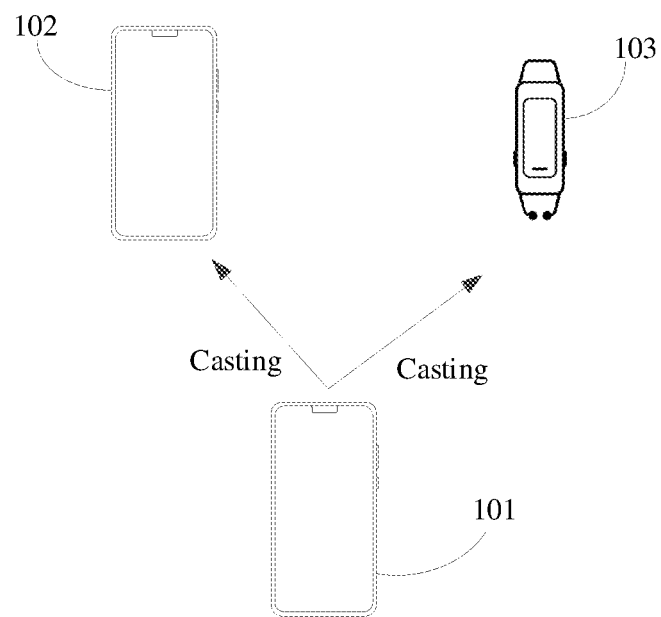
FIG. 2 is a schematic diagram of an architecture of another application scenario of a casting control method according to an embodiment of this application.

FIG. 2 is a schematic diagram of an architecture of another application scenario of a casting control method according to an embodiment of this application. As shown in FIG. 2, for example, an electronic device 101 is used as a source device, and an electronic device 102 and an electronic device 103 each may be used as a destination device of the electronic device 101. The electronic device 101 may simultaneously cast display content in a display interface of the electronic device 101 to the electronic device 102 and the electronic device 103 for display. In other words, one source device may simultaneously perform casting and display on a plurality of destination devices.

In some embodiments, specific structures of electronic devices in an electronic device group 200 may be the same, or may be different.

For example, the electronic device may be specifically a mobile phone, a tablet computer, a smart television, a wearable electronic device, an in-vehicle infotainment, a notebook computer, an ultra-mobile personal computer (UMPC), a handheld computer, a netbook, a personal digital assistant (PDA), a virtual reality device, or the like. This is not limited in this embodiment of this application.

Figure 3:
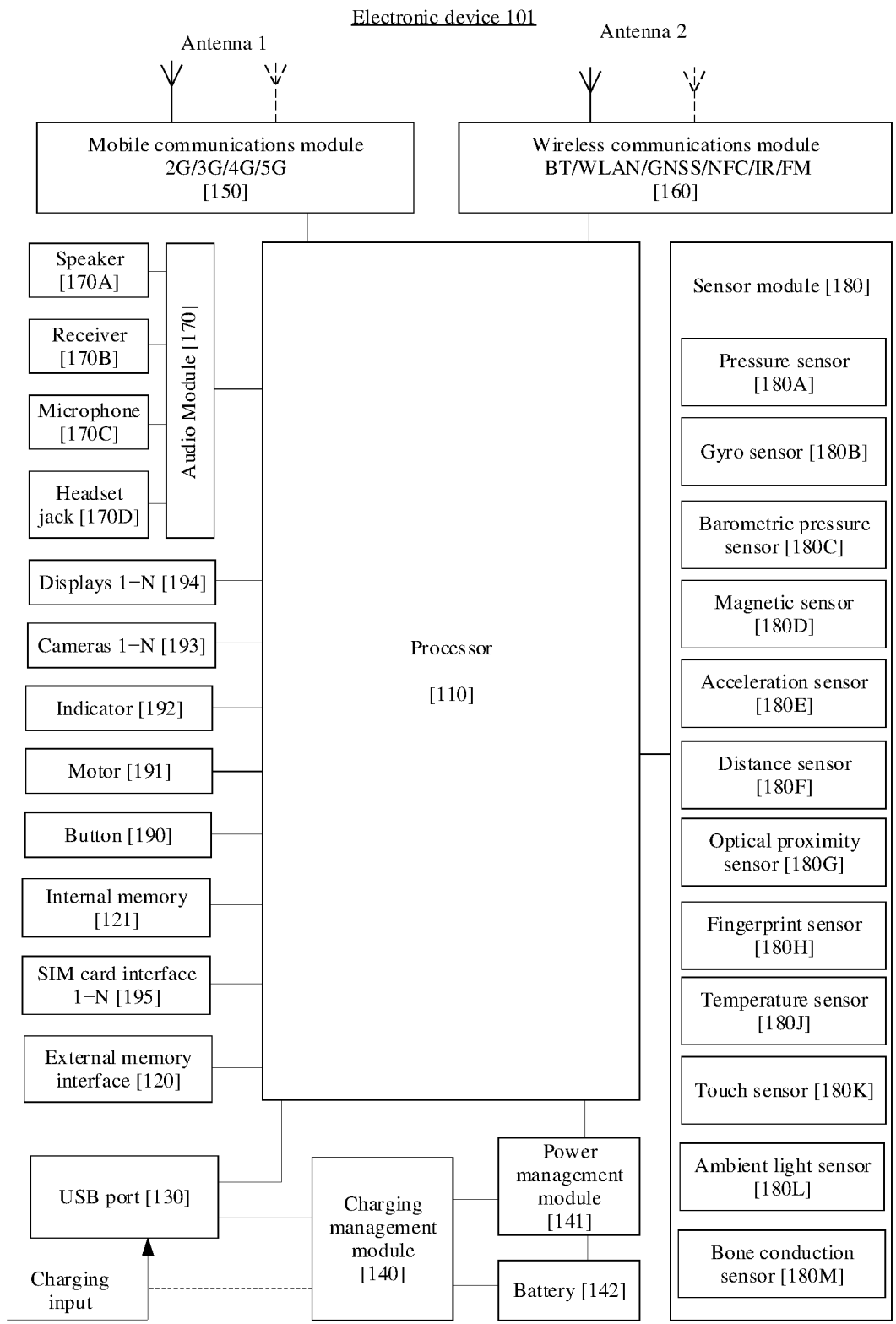
FIG. 3 is a schematic diagram of a structure of an electronic device.

For example, FIG. 3 is a schematic diagram of a structure of an electronic device. As shown in FIG. 3, an electronic device 101 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment does not constitute a specific limitation on the electronic device 101. In some other embodiments, the electronic device 101 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. For example, in this application, the processor 110 may obtain current status information.

The controller may be a nerve center and a command center of the electronic device 101. The controller may generate an operation control signal based on instruction operation code and a time sequence signal, and complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor 110 may directly invoke the instructions or the data from the memory. In this case, repeated access is avoided, a waiting time period of the processor 110 is reduced, and efficiency of a system is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a bidirectional synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 101.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a bidirectional communications bus. The bus converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through the Bluetooth headset.

The MIPI may be configured to connect the processor 110 and a peripheral component such as the display 194 or the camera 193. The MIPI includes a camera serial interface (CSI), a display serial interface (DSI), and the like. In some embodiments, the processor 110 communicates with the camera 193 through the CSI, to implement a photographing function of the electronic device 101. The processor 110 communicates with the display 194 through the DSI, to implement a display function of the electronic device 101.

The GPIO interface may be configured by using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, or the like. The GPIO interface may alternatively be configured as the I2C interface, the I2S interface, the UART interface, the MIPI, or the like.

The USB port 130 is an interface that conforms to a USB standard specification, and may be specifically a mini USB port, a micro USB port, a USB Type C port, or the like. The USB port 130 may be configured to be connected to the charger to charge the electronic device 101, or may be configured to transmit data between the electronic device 101 and a peripheral device, or may be configured to be connected to a headset, to play audio by using the headset. The interface may be further configured to be connected to another terminal device, for example, an AR device.

It may be understood that an interface connection relationship between modules illustrated in this embodiment is merely an example for description, and does not constitute a limitation on the structure of the electronic device 101. In some other embodiments of this application, different interface connection manners in the foregoing embodiments or a combination of a plurality of interface connection manners may alternatively be used for the electronic device 101.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 101. While charging the battery 142, the charging management module 140 may further supply power to a terminal device by using the power management module 141.

The power management module 141 is configured to be connected to the battery 142, the charging management module 140, and the processor 110. The power management module 141 receives an input of the battery 142 and/or the charging management module 140, and supplies power to the processor 110, the internal memory 121, the display 194, the camera 193, the wireless communications module 160, and the like. The power management module 141 may be further configured to monitor a parameter such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 101 may be implemented by using the antenna 1, the antenna 2, the mobile communications module 150, the wireless communications module 160, the modem processor, the baseband processor, or the like.

The antenna 1 and the antenna 2 are configured to transmit and receive an electromagnetic wave signal. Each antenna in the electronic device 101 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that is applied to the electronic device 101 and that includes 2G/3G/4G/5G. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 101 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communication processing unit. The wireless communications module 160 receives an electromagnetic wave through the antenna 2, modulates and filters an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 101 are coupled, and the antenna 2 and the wireless communications module 160 in the electronic device 101 are coupled, so that the electronic device 101 can communicate with a network and another device by using a wireless communications technology. The wireless communication technology may include a global system for mobile communications (GSM), a general packet radio service (GPRS), code division multiple access (CDMA), wideband code division multiple access (wideband code division multiple access, WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 101 may implement a display function through the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute a program instruction to generate or change display information.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 101 may include one or N displays 194, where N is a positive integer greater than 1.

A series of graphical user interfaces (GUI) may be displayed on the display 194 of the electronic device 101, and these GUIs are all home screens of the electronic device 101. Usually, a size of the display 194 of the electronic device 101 is fixed, and only a limited quantity of controls can be displayed on the display 194 of the electronic device 101. The control is a GUI element, is a software component, is included in an application, and controls all data processed by the application and an interaction operation related to the data. A user may interact with the control through direct manipulation, to read or edit information related to the application. Usually, the controls may include visual interface elements such as an icon, a button, a menu, a tab, a text box, a dialog box, a status bar, a navigation bar, or a widget. For example, in this embodiment of this application, the display 194 may display a virtual button (one-click orchestration, orchestration start, or orchestration end).

The electronic device 101 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is cast on the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of RGB, YUV, or the like. In some embodiments, the electronic device 101 may include 1 or N cameras 193, where N is a positive integer greater than 1.

The digital signal processor is configured to process a digital signal, and may process another digital signal in addition to the digital image signal. For example, when the electronic device 101 selects a frequency, the digital signal processor is configured to perform Fourier transform, or the like on energy of the frequency.

The video codec is configured to compress or decompress a digital video. The electronic device 101 may support one or more video codecs. Therefore, the electronic device 101 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, a transfer mode between human brain neurons, and may further continuously perform self-learning. Applications such as intelligent cognition of the electronic device 101, for example, image recognition, facial recognition, speech recognition, and text understanding, may be implemented through the NPU.

The external memory interface 120 may be configured to be connected to an external storage card, for example, a micro SD card, to extend a storage capability of the electronic device 101. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to execute various function applications and data processing of the electronic device 101. For example, in this embodiment, the processor 110 may perform scenario orchestration by executing the instructions stored in the internal memory 121. The internal memory 121 may include a program storage area and a data storage area. The program storage area may store an operating system, an application (for example, a sound playing function or an image playing function) required by at least one function, and the like. The data storage area may store data (for example, audio data or a phone book) created in a process of using the electronic device 101. In addition, the internal memory 121 may include a high-speed random access memory, and may further include a nonvolatile memory, for example, at least one magnetic disk storage device, a flash storage device, or a universal flash storage (UFS). The processor 110 runs the instructions stored in the internal memory 121, and/or instructions stored in memory disposed in the processor, to execute various function applications and data processing of the electronic device 101.

The electronic device 101 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some functional modules of the audio module 170 may be disposed in the processor 110.

The speaker 170A, also referred to as a "horn", is configured to convert an electrical audio signal into a sound signal. The electronic device 101 may be configured to listen to music or answer a call in a hands-free mode by using the speaker 170A.

The receiver 170B, also referred to as an "earpiece", is configured to convert an electrical audio signal into a sound signal. When a call is answered or audio information is listened to by using the electronic device 101, the receiver 170B may be put close to a human ear to listen to a voice.

The microphone 170C, also referred to as a "mike" or a "mic", is configured to convert a sound signal into an electrical signal. When making a call or sending audio information, a user may make a sound near the microphone 170C through the mouth of the user, to enter a sound signal into the microphone 170C. The electronic device 101 may be provided with at least one microphone 170C. In some other embodiments, the electronic device 101 may be provided with two microphones 170C, to implement a noise reduction function in addition to collecting a sound signal. In some other embodiments, the electronic device 101 may alternatively be provided with three, four, or more microphones 170C, to collect a sound signal, implement noise reduction, and identify a sound source, so as to implement a directional recording function, and the like.

The headset jack 170D is configured to be connected to a wired headset. The headset jack 170D may be a USB port 130, or may be a 3.5 mm open mobile terminal platform (OMTP) standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 101 determines pressure intensity based on the change in the capacitance. When a touch operation is performed on the display 194, the electronic device 101 detects intensity of the touch operation by using the pressure sensor 180A. The electronic device 101 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed a Messaging application icon, an instruction for viewing an SMS message is executed. When a touch operation whose touch operation intensity is greater than or equal to the first pressure threshold is performed on the Messages icon, an instruction for newly creating an SMS message is executed.

The gyro sensor 180B may be configured to determine a moving posture of the electronic device 101. In some embodiments, an angular velocity of the electronic device 101 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 101 jitters, calculates, based on the angle, a distance for which a lens module needs to compensate, and allows the lens to cancel the jitter of the electronic device 101 through reverse motion, to implement image stabilization. The gyro sensor 180B may be further used in a navigation scenario and a motion sensing game scenario.

The barometric pressure sensor 180C is configured to measure barometric pressure. In some embodiments, the electronic device 101 calculates an altitude by using a barometric pressure value measured by the barometric pressure sensor 180C, to assist in positioning and navigation.

The magnetic sensor 180D includes a Hall sensor. The electronic device 101 may detect opening and closing of a flip leather case by using the magnetic sensor 180D. In some embodiments, when the electronic device 101 is a flip phone, the electronic device 101 may detect opening and closing of a flip cover based on the magnetic sensor 180D. Further, a feature such as automatic unlocking upon opening of the flip cover is set based on a detected opening or closing state of the leather case or an opening or closing state of the flip cover.

The acceleration sensor 180E may detect acceleration values of the electronic device 101 in various directions (usually on three axes). When the electronic device 101 is still, a magnitude and a direction of gravity may be detected. The acceleration sensor 180E may be further configured to recognize a posture of the terminal device, and is applied to an application such as switching between landscape mode and a portrait mode or a pedometer.

The distance sensor 180F is configured to measure a distance. The electronic device 101 may measure the distance in an infrared manner or a laser manner. In some embodiments, in a photographing scenario, the electronic device 101 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 101 emits infrared light by using the light emitting diode. The electronic device 101 detects infrared reflected light from a nearby object by using the photodiode. When sufficient reflected light is detected, it may be determined that there is an object near the electronic device 101. When insufficient reflected light is detected, the electronic device 101 may determine that there is no object near the electronic device 101. The electronic device 101 may detect, by using the optical proximity sensor 180G, that the user holds the electronic device 101 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 101 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 101 is in a pocket, to avoid an accidental touch.

The fingerprint sensor 180H is configured to collect a fingerprint. The electronic device 101 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 101 executes a temperature processing policy based on the temperature detected by the temperature sensor 180J. For example, when the temperature reported by the temperature sensor 180J exceeds a threshold, the electronic device 101 lowers performance of a processor near the temperature sensor 180J, to reduce power consumption and implement thermal protection. In some other embodiments, when the temperature is less than another threshold, the electronic device 101 heats the battery 142 to prevent the electronic device 101 from being shut down abnormally due to a low temperature. In some other embodiments, when the temperature is less than still another threshold, the electronic device 101 boosts an output voltage of the battery 142 to avoid abnormal shutdown due to a low temperature.

The touch sensor 180K is also referred to as a "touch device". The touch sensor 180K may be disposed on the display 194. The touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 101, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a pulse of a human body, to receive a blood pressure beating signal. In some embodiments, the bone conduction sensor 180M may alternatively be disposed in a headset, to be combined into a bone conduction headset. The audio module 170 may obtain a speech signal through parsing based on the vibration signal, of the vibration bone of the vocal-cord part, that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 101 may receive a key input, and generate a key signal input related to a user setting and function control of the electronic device 101.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, message receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to implement contact with or separation from the electronic device 101. The electronic device 101 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at a same time. The plurality of cards may be of a same type or different types. The SIM card interface 195 is compatible with different types of SIM cards. The SIM card interface 195 is also compatible with an external storage card. The electronic device 101 interacts with a network by using the SIM card, to implement functions such as conversation and data communication. In some embodiments, an eSIM, namely, an embedded SIM card, is used for the electronic device 101. The eSIM card may be embedded into the electronic device 101, and cannot be separated from the electronic device 101.

In addition, an operating system runs on the foregoing components, for example, an iOS operating system developed by Apple, an Android open-source operating system developed by Google, or a Windows operating system developed by Microsoft. Applications can be installed and run in the operating system.

The following describes a casting control method by using an example in which an Android open-source operating system runs on an electronic device.

Figure 4:
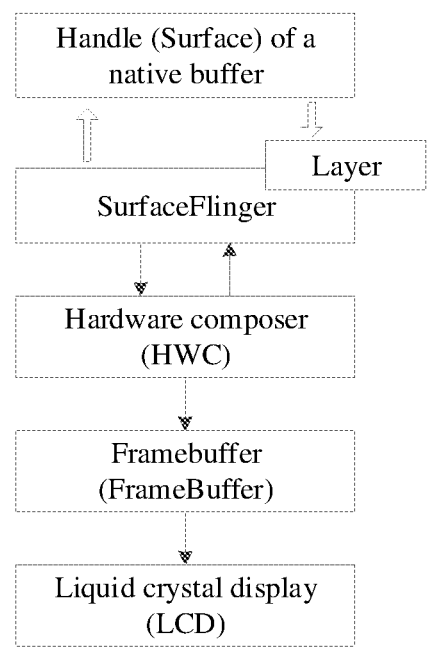
FIG. 4 is a schematic diagram in which an electronic device displays multimedia information.

FIG. 4 is a schematic diagram in which an electronic device displays multimedia information. As shown in FIG. 4, that the multimedia information is a picture is used as an example. When the electronic device displays the picture, an application in the electronic device first applies for a handle (Surface) of a native buffer, to determine a to-be-displayed graphical interface, for example, a size, a location, or display content, and sends surface data to SurfaceFlinger. In SurfaceFlinger, the surface data can be understood as a layer. Then, SurfaceFlinger sends key information in to-be-synthesized layer data to a hardware composer (HWC), and the HWC marks, based on information such as performance of a GPU and/or whether the GPU is in an idle state, specific to-be-synthesized layer data that needs to be synthesized by using the GPU and specific to-be-synthesized layer data that needs to be synthesized by using the HWC that are in the key information. After marking is completed, SurfaceFlinger sends complete information of the to-be-synthesized layer data that needs to be synthesized by the GPU to the GPU, and after the GPU completes synthesis, sends content obtained after synthesis and complete information of the to-be-synthesized layer data that needs to be synthesized by the HWC to the HWC together, to complete synthesis of remaining layer data. The HWC outputs all synthesized layer data to a framebuffer, to output the synthesized layer (layer) data to a liquid crystal display (LCD) for display, or the HWC directly outputs all synthesized layer data to the LCD for display.

Figure 5:
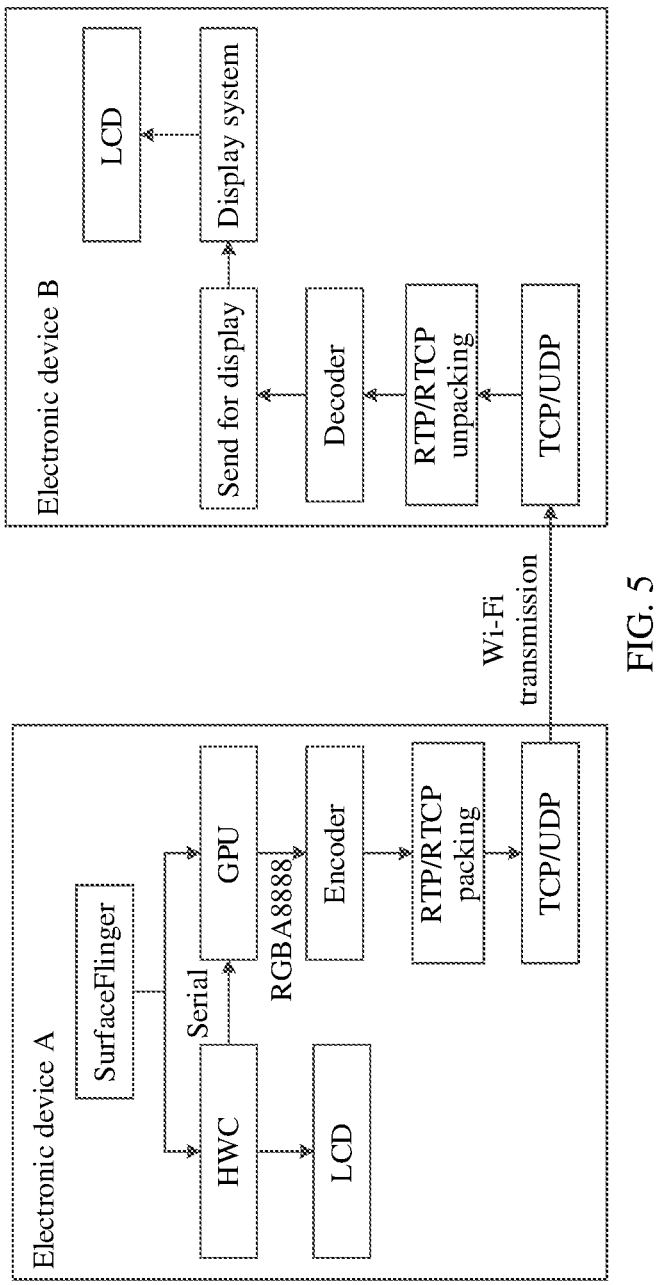
FIG. 5 is a schematic diagram in which an electronic device displays multimedia information in a casting scenario in the conventional technology.

A multimedia information display process in the conventional technology is described below by using one casting initiation device, namely, a source device, and one casting receiving device, namely, a destination device as an example. When there are a plurality of casting receiving devices, a process and a principle are similar to those of a multimedia information display process existing when there is only one casting receiving device. Details are not described herein. FIG. 5 is a schematic diagram in which an electronic device displays multimedia information in a casting scenario in the conventional technology. As shown in FIG. 5, it is assumed that an electronic device A is a source device, and an electronic device B is a destination device. To be specific, the electronic device A may cast display content in a display interface of the electronic device A to the electronic device B for display. In addition to completing display of an interface of the electronic device A, the electronic device A further needs to synthesize display content to be displayed on the electronic device B.

Specifically, when casting starts, SurfaceFlinger in the electronic device A creates a virtual screen. The virtual screen is configured to send screen information through a network. The screen information may be understood as multimedia information that currently needs to be displayed on a display of the electronic device A. After obtaining a to-be-synthesized layer corresponding to multimedia information displayed on the electronic device A, SurfaceFlinger sends the to-be-synthesized layer to an HWC in the electronic device A, and further needs to send, to a GPU in the electronic device A, a to-be-composed layer corresponding to multimedia information displayed on the virtual screen. It can be understood that the to-be-composed layer corresponding to the multimedia information displayed on the electronic device A is the same as the to-be-composed layer corresponding to the multimedia information displayed on the virtual screen.

After completing layer synthesis, the GPU in the electronic device A outputs to-be-encoded data in an RGBA8888 format, and sends the to-be-encoded data to an encoder. After the encoder performs encoding and compression, packing processing is performed on encoded and compressed data based on a real-time transport protocol (RTP) and an RTP control protocol (RTCP). Then, data obtained after packing processing is sent to the electronic device B based on a transmission control protocol (TCP) and a user datagram protocol (UDP). For example, the data obtained after packing processing may be sent to the electronic device B through a Wi-Fi network.

After receiving the data obtained after packing processing that is sent by the electronic device A, the electronic device B unpacks the received data based on the RTP or the RTCP, and sends the unpacked data to a decoder for decoding processing, to obtain content obtained after decoding, that is, obtain the multimedia information. The electronic device B sends the obtained multimedia information to a display system, to display the multimedia information by using the LCD.

After the GPU in the electronic device A completes layer synthesis, the HWC performs local layer synthesis, and sends synthesized layer data to the LCD, so that the electronic device A displays multimedia information corresponding to the synthesized layer data.

In the casting scenario, a process in which the HWC performs layer synthesis and a process in which the GPU performs layer synthesis are executed in serial. To be specific, the HWC needs to perform layer synthesis after the GPU completes layer synthesis. Therefore, efficiency of an execution process is low, causing low efficiency of a casting and display process of the multimedia information. In addition, after completing layer synthesis, the GPU fixedly outputs data in the RGBA8888 format to the encoder for encoding. The RGBA8888 format includes a red channel, a green channel, a blue channel, and an alpha (transparency)

channel. Each channel occupies 8 bits. Data in the format occupies large space memory. For example, a 1024*1024 picture occupies space whose size is 1024*1024*4 bytes, namely, 4M; and a 2048*2048 picture occupies space whose size is 2048*2048*32/8/1000/1000 bytes, namely, 16M. A size of space occupied when an OpenGL ES generates a texture is automatically extended to the power of 2. For example, an 85*121 picture occupies 64K memory after the texture is generated. A background picture or a large quantity of pictures with gradient colors are usually in the RGBA8888 format in an entire scene. It can be learned from the foregoing descriptions that a picture in the RGBA8888 format usually has a large data amount, and occupies large memory space, causing low data transmission efficiency, and low efficiency of the casting and display process of the multimedia information.

In consideration of the foregoing problem, this application provides a casting control method. The method is applied to a first electronic device, and the first electronic device includes a GPU and an HWC. When the first electronic device is in a casting state, whether a to-be-synthesized layer corresponding to multimedia information to be cast and displayed includes a video security layer is determined; the to-be-synthesized layer may be separately sent to the GPU and the HWC if the video security layer is not included; the to-be-synthesized layer is synthesized in parallel by using the GPU and the HWC, and a first layer synthesized by the GPU is sent to a second electronic device, to display the multimedia information corresponding to the first layer on the second electronic device; and the multimedia information corresponding to a second layer synthesized by the HWC is displayed. When the to-be-synthesized layer corresponding to the multimedia information to be cast and displayed does not include the video security layer, the to-be-synthesized layer may be synthesized in parallel by using the GPU and the HWC, to improve layer synthesis efficiency and further improve multimedia information casting efficiency. In addition, a data format of the first layer synthesized by the GPU may be set to a first data format, for example, set to YUV420sp. Because a data amount of data in the first data format is less than a data amount of data in an RGBA8888 format, data transmission efficiency can be improved, and multimedia information casting efficiency can be further improved.

A technical solution of a casting control method provided in this application is described in detail below by using a detailed embodiment. It can be understood that the following several specific embodiments may be combined with each other, and a same or similar concept or process may not be described repeatedly in some embodiments.

Figure 6:
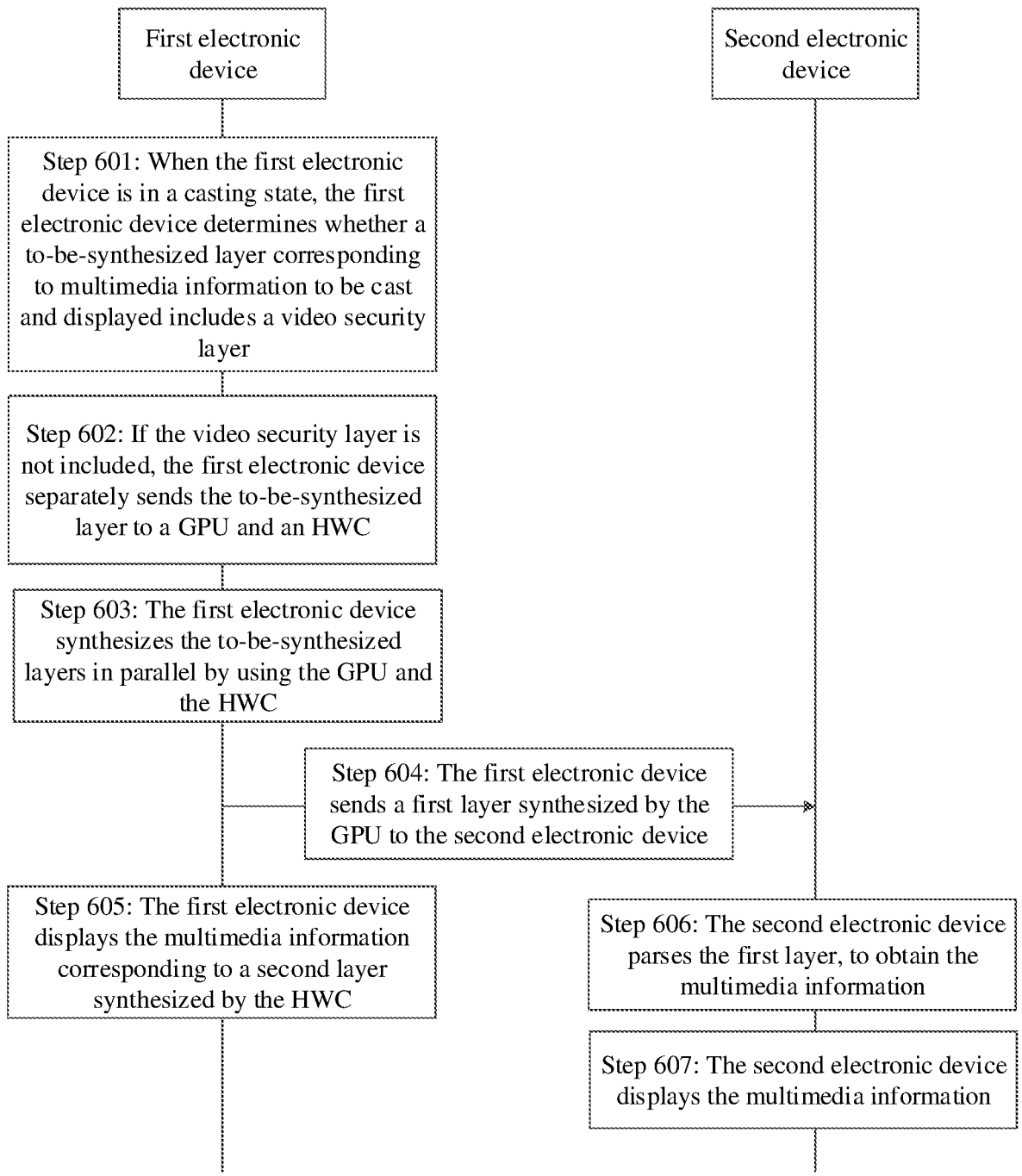
FIG. 6 is a signaling diagram of a casting control method according to an embodiment of this application.

FIG. 6 is a signaling diagram of a casting control method according to an embodiment of this application. It should be noted that although steps of the method are presented in a particular order in this embodiment of this application, a sequence of the steps may be changed in different embodiments. In addition, in some embodiments, one or more steps shown in sequence in this specification may be simultaneously performed. As shown in FIG. 6, the method includes the following steps.

Step 601: When a first electronic device is in a casting state, the first electronic device determines whether a to-be-synthesized layer corresponding to multimedia information to be cast and displayed includes a video security layer.

In this step, the multimedia information includes a picture, a video, an audio, or the like. The to-be-synthesized layer corresponding to the multimedia information is used to represent a to-be-displayed graphical interface, including a size and a location of the interface, content displayed in the interface, or the like. There may be one or more to-be-synthesized layers.

When displaying the multimedia information, the first electronic device needs to identify a display state, to be specific, identify whether the first electronic device is currently in the casting state or a local display state. In a possible implementation, whether a virtual screen creation method and an encoder creation method are invoked may be determined. If it is determined that the virtual screen creation method and the encoder creation method are invoked, it may be determined that the first electronic device is in the casting state; and if it is determined that the virtual screen creation method and the encoder creation method are not invoked, it may be determined that the first electronic device is in the local display state.

Specifically, if a system of the first electronic device enters the casting state, the first electronic device creates a virtual screen and an encoder by default. The virtual screen is configured to prepare data that needs to be sent. The data that needs to be sent may be understood as data of the multimedia information, and is used by the second electronic device to display the multimedia information. The encoder is configured to compress data. A person skilled in the art may understand that, the first electronic device usually invokes the virtual screen creation method (create virtual display) when creating the virtual screen, and the first electronic device usually invokes the encoder creation method (MediaCodec.create) when creating the encoder. When determining that the two methods are invoked, the first electronic device determines that the first electronic device enters the casting state. In this case, the first electronic device initializes a casting status bit, for example, sets CastScreenTag of casting to True.

If the first electronic device determines that the two methods are not invoked, the first electronic device may determine that the first electronic device is in the local display state, to be specific, only locally display the multimedia information.

After determining that the first electronic device is in the casting state, the first electronic device initializes a distributed layer synthesis module, in other words, creates the distributed layer synthesis module. The first electronic device submits, to SurfaceFlinger by using the distributed layer synthesis module, the to-be-synthesized layer corresponding to the multimedia information that needs to be cast and displayed, and analyzes an attribute of the to-be-synthesized layer, to determine whether the to-be-synthesized layer includes the video security layer. A buffer corresponding to the video security layer is memory allocated by a secure memory allocator, and does not allow screenshot for display.

Specifically, if a layer whose eSecure attribute is True exists in the to-be-synthesized layer, it may be determined that the layer is the video security layer. If a layer whose eSecure attribute is True does not exist in all to-be-synthesized layers, it may be determined that the to-be-synthesized layers do not include the video security layer.

Step 602: If the video security layer is not included, the first electronic device separately sends the to-be-synthesized layer to a GPU and an HWC.

In this step, if determining that the to-be-synthesized layer does not include the video security layer, the first electronic device simultaneously sends the to-be-synthesized layer to the GPU and the HWC, to synthesize the to-be-synthesized layer.

A person skilled in the art may understand that, to ensure information security, if the to-be-synthesized layer corresponding to the multimedia information to be cast and displayed includes the video security layer, content corresponding to the video security layer can only be locally displayed, and cannot be sent to a casting receiving device for casting and display. Therefore, when performing casting, the first electronic device needs to first determine whether the to-be-synthesized layer includes the video security layer, and simultaneously sends the to-be-synthesized layer to the GPU and the HWC when determining that the to-be-synthesized layer does not include the video security layer.

Step 603: The first electronic device synthesizes the to-be-synthesized layers in parallel by using the GPU and the HWC.

Figure 7:
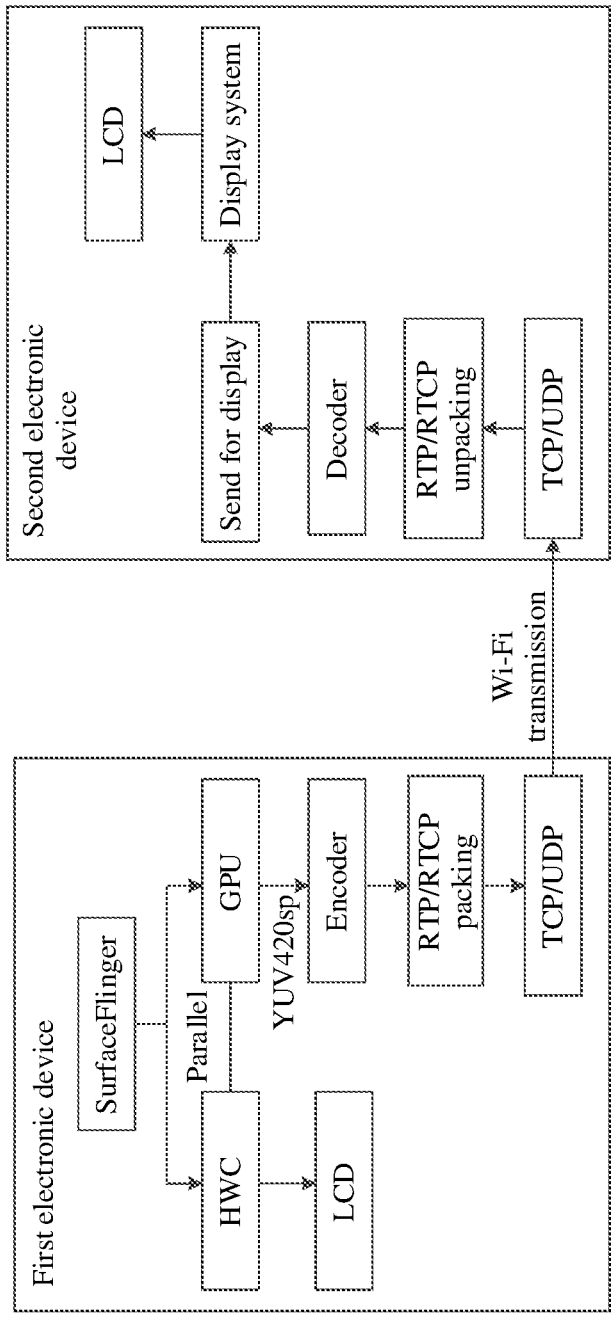
FIG. 7 is a schematic diagram in which an electronic device displays multimedia information in a casting scenario according to an embodiment of this application.

FIG. 7 is a schematic diagram in which an electronic device displays multimedia information in a casting scenario according to an embodiment of this application. As shown in FIG. 7, after SurfaceFlinger separately sends the to-be-synthesized layer to the GPU and the HWC, the first electronic device synthesizes the to-be-synthesized layer in parallel by using the GPU and the HWC. It may also be understood that the GPU and the HWC simultaneously synthesize the received to-be-synthesized layers. Because the GPU and the HWC may synthesize the to-be-synthesized layers in parallel, layer synthesis efficiency can be improved.

For example, to reduce a data transmission amount, in this embodiment of this application, a data format of a first layer synthesized by the GPU may be set to a first data format. A data amount of data in the first data format is less than a data amount of data in an RGBA8888 format.

In this embodiment, because the data amount of the data in the first data format is less than the data amount of the data in the RGBA8888 format, a data transmission amount can be reduced, data transmission efficiency can be improved, storage efficiency can be optimized, and display bandwidth can be reduced.

For example, the first data format may be YUV420sp.

Specifically, after a planar storage format is added to a YUV420 sampling format, a YUV420P format and a YUV420sp format may be generated. In YUV420P, storage is performed by sequentially using Y, U, and V. YUV420P is equivalent to chw in RGB, and may be further divided into an I420 format (also referred to as YU12) and a YV12 format. In YUV420SP, storage is performed by using Y and then alternately using U and V. YUV420SP may be further divided into an NV12 format and an NV21 format. The four formats obtained through division are as follows:

(1) NV12: FourCC is 0x3231564E, and one pixel includes 12 bits. An 8-bit Y plane is a Y channel. After a Y channel plane, a U channel plane and a V channel plane are alternately used. A 2×2 sampling rate is used for U/V (each is a quarter of that of Y).

(2) NV21: FourCC is 0x3132564E, and one pixel includes 12 bits. NV21 is the same as NV12, except that V is used before U when U and V are alternately used, that is, a difference between U/V and V/U. A standard of a camera image in a current Android system is the format.

(3) I420 (also referred to as YU12): FourCC is 0x30323449, and one pixel includes 12 bits. After an 8-bit Y channel plane, a U channel plane is used, and finally, a V channel plane is used.

(4) YV12: FourCC is 0x32315659, and one pixel includes 12 bits. After an 8-bit Y channel plane, a V channel plane is used, and finally, a U channel plane is used.

In this embodiment, because a data amount of data in the YUV420sp format is less than the data amount of the data in the RGBA8888 format, a data transmission amount can be reduced, and data transmission efficiency can be improved.

Step 604: The first electronic device sends the first layer synthesized by the GPU to the second electronic device.

After synthesizing the to-be-synthesized layers to obtain the first layer, the GPU may send the first layer to the second electronic device, so that the second electronic device displays corresponding multimedia information.

For example, when sending the first layer, the first electronic device may encode the first layer, to obtain an encoded layer, pack the encoded layer based on an RTP or an RTCP, and then send a layer obtained after packing processing to the second electronic device.

Specifically, still referring to FIG. 7, after synthesizing the first layer, the GPU sends the first layer to an encoder, to encode and compress the first layer, so as to obtain the encoded layer. Then, the first electronic device performs RTP or RTCP packing on the obtained encoded layer, and then sends, based on a TCP or a UDP through a Wi-Fi network, the layer obtained after packing processing to the second electronic device.

In this embodiment, the first electronic device encodes and compresses the first layer, and performs RTP or RTCP packing processing on the encoded layer, to send the layer obtained after packing processing to the second electronic device. In this way, not only layer data security can be improved, but also a data transmission amount can be reduced, and data transmission efficiency can be improved.

Step 605: The first electronic device displays the multimedia information corresponding to a second layer synthesized by the HWC.

In this step, still referring to FIG. 7, after synthesizing the to-be-synthesized layer by using the HWC to obtain the second layer, the first electronic device sends the second layer to an LCD, to display the multimedia information corresponding to the second layer on the LCD. The multimedia information corresponding to the second layer is the multimedia information that needs to be cast and displayed.

Step 606: The second electronic device parses the first layer, to obtain the multimedia information.

In this step, after receiving the first layer sent by the first electronic device, the second electronic device may parse the first layer, to obtain the multimedia information that needs to be displayed. For example, the first layer may be unpacked based on the RTP or the RTCP, the layer obtained after unpacking processing is decoded, and then a format of a decoded layer is converted from the first data format into the RGBA8888 format, to obtain the multimedia information.

Specifically, if the first electronic device performs packing processing on the encoded layer based on the RTP, the second electronic device unpacks the received first layer based on the RTP correspondingly, and if the first electronic device performs packing processing on the encoded layer based on the RTCP, the second electronic device unpacks the received first layer based on the RTCP correspondingly. Then, a layer obtained after unpacking processing is sent to a decoder, to decode the layer obtained after unpacking processing.

In addition, currently, when the multimedia information is displayed by using the LCD, a format of the multimedia information usually needs to be the RGBA8888 format. Because the format of the first layer synthesized by the GPU of the first electronic device is the first data format, the second electronic device further needs to convert the format of the decoded layer from the first data format into the RGBA8888 format, to obtain the multimedia information.

In this embodiment, the second electronic device converts the format of the decoded layer from the first data format into the RGBA8888 format, to ensure that the multimedia information is correctly displayed.

It can be understood that step 604 may be performed before step 605, or step 605 may be performed before step 604, or certainly, step 604 and step 605 may be simultaneously performed.

Step 607: The second electronic device displays the multimedia information.

In this step, the second electronic device may send the obtained multimedia information to a display system, to display the multimedia information by using the LCD. The multimedia information displayed on the second electronic device is the same as the multimedia information displayed on the first electronic device.

According to the casting control method provided in this embodiment of this application, the method is applied to the first electronic device, and the first electronic device includes the GPU and the HWC. When the first electronic device is in the casting state, whether the to-be-synthesized layer corresponding to the multimedia information to be cast and displayed includes the video security layer is determined; the to-be-synthesized layer may be separately sent to the GPU and the HWC if the video security layer is not included; the to-be-synthesized layer is synthesized in parallel by using the GPU and the HWC, and the first layer synthesized by the GPU is sent to the second electronic device, to display the multimedia information corresponding to the first layer on the second electronic device; and the multimedia information corresponding to a second layer synthesized by the HWC is displayed. When the to-be-synthesized layer corresponding to the multimedia information to be cast and displayed does not include the video security layer, the to-be-synthesized layer may be synthesized in parallel by using the GPU and the HWC, to improve layer synthesis efficiency and further improve multimedia information casting efficiency. In addition, the data format of the first layer synthesized by the GPU may be set to the first data format, for example, set to YUV420sp. Because the data amount of the data in the first data format is less than the data amount of the data in the RGBA8888 format, data transmission efficiency can be improved, and multimedia information casting efficiency can be further improved.

Figure 8:
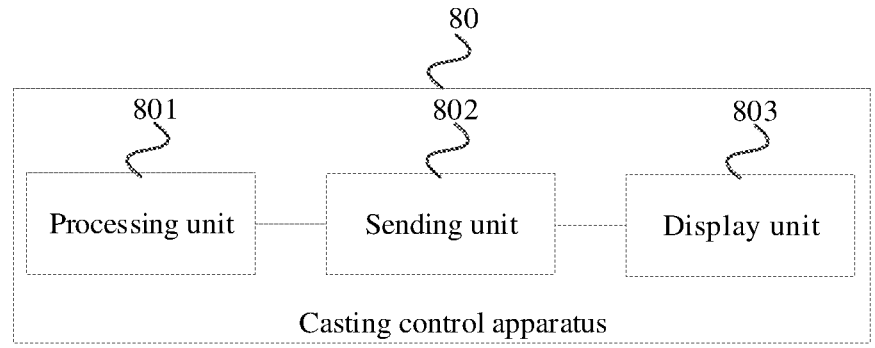
FIG. 8 is a schematic diagram of a structure of a casting control apparatus according to an embodiment of this application.

FIG. 8 is a schematic diagram of a structure of a casting control apparatus 80 according to an embodiment of this application. The apparatus includes a graphics processing unit GPU and a hardware composer HWC. Referring to FIG. 8, the casting control apparatus 80 may include: a processing unit 801, configured to: when the casting control apparatus is in a casting state, determine whether a to-be-synthesized layer corresponding to multimedia information to be cast and displayed includes a video security layer; a sending unit 802, configured to separately send the to-be-synthesized layer to the GPU and the HWC when the video security layer is not included, where the processing unit 801 is further configured to synthesize the to-be-synthesized layer in parallel by using the GPU and the HWC; and the sending unit 802 is further configured to send a first layer synthesized by the GPU to a second electronic device, to display the multimedia information corresponding to the first layer on the second electronic device; and a display unit 803, configured to display the multimedia information corresponding to a second layer synthesized by the HWC.

Optionally, a format of the first layer is a first data format, and a data amount of data in the first data format is less than a data amount of data in an RGBA8888 format.

Optionally, the first data format is YUV420sp.

Optionally, the sending unit 802 is specifically configured to: encode the first layer, to obtain an encoded layer; pack the encoded layer based on a real-time transport protocol RTP or an RTP control protocol RTCP; and send a layer obtained after packing processing to the second electronic device.

Optionally, the sending unit 802 is specifically configured to: send, based on a transmission control protocol TCP or a user datagram protocol UDP, the layer obtained after packing processing to the second electronic device.

Optionally, the processing unit 801 is specifically configured to: determine whether a virtual screen creation method and an encoder creation method are invoked; and if it is determined that the virtual screen creation method and the encoder creation method are invoked, determine that the first electronic device is in the casting state.

The casting control apparatus 80 shown in this embodiment of this application may perform the technical solution of the casting control method shown in any one of the foregoing embodiments. Implementation principles and beneficial effects thereof are similar, and details are not described herein again.

It should be noted that division into units of the apparatus is merely logical function division. In an actual implementation, all or some units may be integrated into one physical entity, or may be physically separated. In addition, these units may be all implemented in a form of calling software by a processing element, may be all implemented in a form of hardware, or may be partially implemented in a form of calling software by a processing element, and partially are implemented in a form of hardware. For example, the sending unit may be an independently disposed processing element, or may be integrated into a chip of casting control apparatus for implementation, or may be stored in a memory of a casting control apparatus in a form of a program. A processing element of the casting control apparatus invokes and executes a function of the sending unit. An implementation of another unit is similar. In addition, all or some of these units may be integrated together, or may be implemented independently. Herein, the processing element may be an integrated circuit and has a signal processing capability. In an implementation process, steps in the foregoing method or the foregoing units may be implemented by using a hardware integrated logical circuit in the processing element, or by using instructions in a form of software. In addition, the sending unit is a sending control unit. Information may be sent by using a sending apparatus of the casting control apparatus, for example, an antenna and a radio frequency apparatus.

The foregoing units may be one or more integrated circuits configured to implement the foregoing method, for example, one or more application-specific integrated circuits (ASIC), one or more microprocessors, or one or more field programmable gate arrays (FPGA). For another example, when one of the foregoing units is implemented in a form of scheduling a program by a processing element, the processing element may be a general purpose processor, for example, a central processing unit (CPU) or another processor that can invoke the program. For another example, the units may be integrated together and implemented in a form of a system-on-a-chip (SOC).

Figure 9:
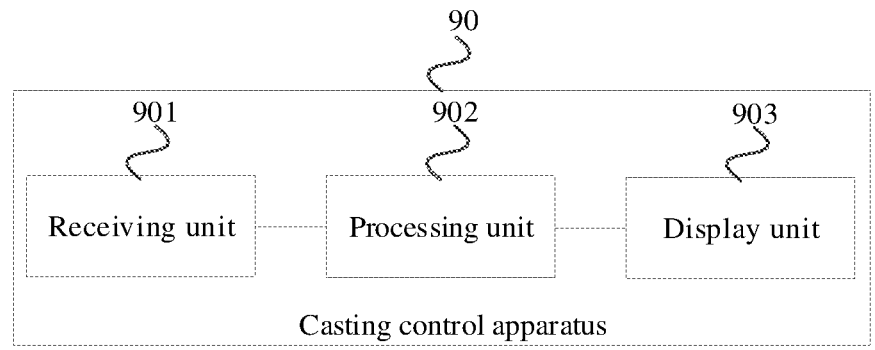
FIG. 9 is a schematic diagram of a structure of a casting control apparatus according to an embodiment of this application.

FIG. 9 is a schematic diagram of a structure of a casting control apparatus 90 according to an embodiment of this application. Referring to FIG. 9, the casting control apparatus 90 may include: a receiving unit 901, configured to receive a first layer sent by a first electronic device, where the first layer is synthesized in parallel with a second layer when the first electronic device is in a casting state and it is determined that a to-be-synthesized layer corresponding to multimedia information to be cast and displayed does not include a video security layer, the first layer is synthesized by using a graphics processing unit GPU in the first electronic device, and the second layer is synthesized by using a hardware composer HWC in the first electronic device; a processing unit 902, configured to parse the first layer, to obtain the multimedia information; and a display unit 903, configured to display the multimedia information.

Optionally, a format of the first layer is a first data format, and a data amount of data in the first data format is less than a data amount of data in an RGBA8888 format.

Optionally, the first data format is YUV420sp.

Optionally, the processing unit 902 is specifically configured to: unpack the first layer based on a real-time transport protocol RTP or an RTP control protocol RTCP; decode a layer obtained after unpacking processing; and convert a format of a decoded layer from the first data format into the RGBA8888 format, to obtain the multimedia information.

Optionally, the receiving unit 901 is specifically configured to receive data of the first layer based on a transmission control protocol TCP or a user datagram protocol UDP.

The casting control apparatus shown in this embodiment of this application may perform the technical solution of the resource determining method shown in any one of the foregoing embodiments. Implementation principles and beneficial effects thereof are similar, and details are not described herein again.

It should be noted that division into units of the apparatus is merely logical function division. In an actual implementation, all or some units may be integrated into one physical entity, or may be physically separated. In addition, these units may be all implemented in a form of calling software by a processing element, may be all implemented in a form of hardware, or may be partially implemented in a form of calling software by a processing element, and partially are implemented in a form of hardware. For example, the sending unit may be an independently disposed processing element, or may be integrated into a chip of a casting control apparatus for implementation, or may be stored in a memory of a casting control apparatus in a form of a program. A processing element of the casting control apparatus invokes and executes a function of the sending unit. An implementation of another unit is similar. In addition, all or some of these units may be integrated together, or may be implemented independently. Herein, the processing element may be an integrated circuit and has a signal processing capability. In an implementation process, steps in the foregoing method or the foregoing units may be implemented by using a hardware integrated logical circuit in the processing element, or by using instructions in a form of software. In addition, the sending unit is a sending control unit. Information may be sent by using a sending apparatus of the casting control apparatus, for example, an antenna and a radio frequency apparatus.

The foregoing units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing units is implemented in a form of scheduling a program by a processing element, the processing element may be a general purpose processor, for example, a central processing unit (CPU) or another processor that can invoke the program. For another example, the units may be integrated together and implemented in a form of a system-on-a-chip (SOC).

Figure 10:
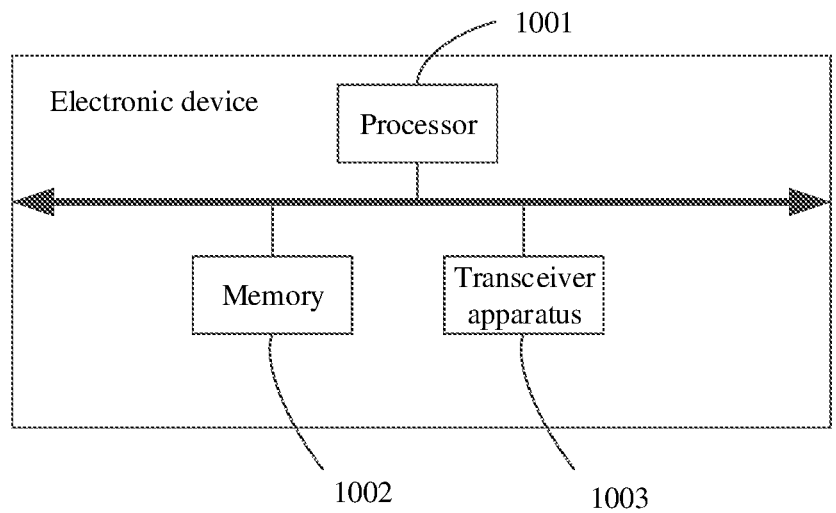
FIG. 10 is a schematic diagram of a structure of an electronic device according to an embodiment of this application.

FIG. 10 is a schematic diagram of a structure of an electronic device according to an embodiment of this application. As shown in FIG. 10, the electronic device includes a processor 1001, a memory 1002, and a transceiver apparatus 1003. The transceiver apparatus 1003 may be connected to an antenna. In a downlink direction, the transceiver apparatus 1003 receives, by using the antenna, information sent by a base station, and sends the information to the processor 1001 for processing. In an uplink direction, the processor 1001 processes data of a terminal, and sends the data to a base station by using the transceiver apparatus 1003.

The memory 1002 is configured to store a program for implementing the foregoing method embodiment or the units in the embodiment shown in FIG. 8 or FIG. 9. The processor 1001 invokes the program to perform operations in the foregoing method embodiment, to implement the unit shown in FIG. 8 or FIG. 9.

Alternatively, some or all of the foregoing units may be implemented by being built into a chip of the electronic device in a form of an integrated circuit. In addition, the units may be implemented separately, or may be integrated together. The foregoing units may be one or more integrated circuits configured to implement the foregoing method, for example, one or more application-specific integrated circuits (ASIC), one or more microprocessors (DSP), or one or more field programmable gate arrays (FPGA).

An embodiment of this application further provides a chip. The chip includes a programmable logic circuit and an input interface. The input interface is configured to obtain to-be-processed data. The logic circuit is configured to perform the casting control method shown in any one of the foregoing embodiments on the to-be-processed data. An implementation principle and a beneficial effect thereof are similar to an implementation principle and a beneficial effect of the casting control method, and details are not described herein again.

An embodiment of this application further provides a computer-readable storage medium. The computer-readable storage medium stores instructions. When the instructions run on an electronic device, the electronic device is enabled to perform the casting control method shown in any one of the foregoing embodiments. An implementation principle and a beneficial effect thereof are similar to an implementation principle and a beneficial effect of the casting control method, and details are not described herein again.

An embodiment of this application further provides a computer program product. When the computer program product runs on an electronic device, the electronic device is enabled to perform the casting control method shown in any one of the foregoing embodiments. An implementation principle and a beneficial effect thereof are similar to an implementation principle and a beneficial effect of the casting control method, and details are not described herein again.

The processor in the foregoing embodiments may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor, or the like. The steps in the methods disclosed with reference to embodiments of this application may be directly performed and completed by a hardware decoding processor, or may be performed and completed by a combination of hardware and a software module in the decoding processor. A software module may be located in a mature storage medium in the art such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

In the several embodiments provided in this application, it should be understood that the disclosed apparatus and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected based on an actual requirement, to achieve objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of hardware in addition to a software functional unit.

What is claimed is:

1. A method, applied to a first electronic device, wherein the first electronic device comprises a graphics processing unit (GPU) and a hardware composer (HWC), and the method comprises:
    when the first electronic device is in a casting state, determining whether a to-be-synthesized layer corresponding to multimedia information to be cast and displayed comprises a video security layer;
    determining that the to-be-synthesized layer does not comprise the video security layer;
    separately sending, from SurfaceFlinger, the to-be-synthesized layer to the GPU and the HWC in response to determining that the to-be-synthesized layer does not comprise the video security layer;
    simultaneously synthesizing the same to-be-synthesized layer in parallel by using the GPU and the HWC, to obtain a first layer synthesized by the GPU and a second layer synthesized by the HWC;
    sending the first layer synthesized by the GPU to a second electronic device, to display the multimedia information corresponding to the first layer on the second electronic device; and
    displaying the multimedia information corresponding to the second layer synthesized by the HWC.

2. The method according to claim 1, wherein a format of the first layer is a first data format, the first data format is used by the GPU for the first layer based on the first electronic device being in the casting state, and a data amount of data in the first data format is less than a data amount of data in an RGBA8888 format.

3. The method according to claim 2, wherein the first data format is YUV420sp.

4. The method according to claim 1, wherein sending the first layer synthesized by the GPU to the second electronic device comprises:
    encoding the first layer, to obtain an encoded layer;
    packing the encoded layer based on a real-time transport protocol (RTP) or an RTP control protocol (RTCP), to obtain a third layer; and
    sending the third layer to the second electronic device.

5. The method according to claim 4, wherein sending the third layer obtained after packing processing to the second electronic device comprises:
    sending, based on a transmission control protocol (TCP), the third layer obtained after packing processing to the second electronic device.

6. The method according to claim 4, wherein sending the third layer obtained after packing processing to the second electronic device comprises:
    sending, based on a user datagram protocol (UDP), the third layer obtained after packing processing to the second electronic device.

7. The method according to claim 1, wherein determining that the first electronic device is in the casting state comprises:
    determining whether a virtual screen creation process and an encoder creation process are invoked; and
    when it is determined that the virtual screen creation process and the encoder creation process are invoked, determining that the first electronic device is in the casting state.

8. A method, applied to a second electronic device, the method comprising:
    receiving a first layer sent by a first electronic device, wherein the first layer is synthesized in parallel with a second layer when the first electronic device is in a casting state and in response to a determination that a to-be-synthesized layer corresponding to multimedia information to be cast and displayed does not comprise a video security layer, the first layer is synthesized by using a graphics processing unit (GPU) in the first electronic device, the second layer is synthesized by using a hardware composer (HWC) in the first electronic device, and the same to-be-synthesized layer is simultaneously synthesized in parallel by using the GPU and the HWC, to obtain the first layer synthesized by the GPU and the second layer synthesized by the HWC;
    parsing the first layer to obtain the multimedia information; and
    displaying the multimedia information.

9. The method according to claim 8, wherein a format of the first layer is a first data format, the first data format is used by the GPU for the first layer based on the first electronic device being in a casting state, and a data amount of data in the first data format is less than a data amount of data in an RGBA8888 format.

10. The method according to claim 9, wherein the first data format is YUV420sp.

11. The method according to claim 9, wherein parsing the first layer to obtain the multimedia information comprises:
    unpacking the first layer based on a real-time transport protocol (RTP) to obtain a third layer;

decoding the third layer obtained after unpacking processing to obtain a decoded layer; and converting a format of the decoded layer from the first data format into an RGBA8888 format, to obtain the multimedia information.

12. The method according to claim 9, wherein parsing the first layer to obtain the multimedia information comprises:

unpacking the first layer based on a real-time transport protocol (RTP) control protocol (RTCP), to obtain a third layer;

decoding the third layer obtained after unpacking processing to obtain a decoded layer; and converting a format of the decoded layer from the first data format into an RGBA8888 format, to obtain the multimedia information.

13. The method according to claim 8, wherein receiving the first layer sent by the first electronic device comprises:

receiving the data of the first layer based on a transmission control protocol (TCP) or a user datagram protocol (UDP).

14. A first electronic device, comprising:

a graphics processing unit (GPU);

a hardware composer (HWC);

at least one memory configured to store program instructions; and at least one processor configured to execute the program instructions to perform:

when the first electronic device is in a casting state, determining whether a to-be-synthesized layer corresponding to multimedia information to be cast and displayed comprises a video security layer;

determining that the to-be-synthesized layer does not comprise the video security layer;

in response to determining that the to-be-synthesized layer does not comprise the video security layer, separately sending, from SurfaceFlinger, the to-be-synthesized layer to the GPU and the HWC simultaneously synthesizing the same to-be-synthesized layer in parallel by using the GPU and the HWC, to obtain a first layer synthesized by the GPU and a second layer synthesized by the HWC;

sending the first layer synthesized by the GPU to a second electronic device, to display the multimedia information corresponding to the first layer on the second electronic device; and displaying the multimedia information corresponding to the second layer synthesized by the HWC.

15. The device according to claim 14, wherein a format of the first layer is a first data format, the first data format is used by the GPU for the first layer based on the first electronic device being in the casting state, and a data amount of data in the first data format is less than a data amount of data in an RGBA8888 format.

16. The device according to claim 15, wherein the first data format is YUV420sp.

17. The device according to claim 14, wherein the at least one processor is configured to execute the program instructions to perform:

encoding the first layer, to obtain an encoded layer;

packing the encoded layer based on a real-time transport protocol (RTP) or an RTP control protocol (RTCP), to obtain a third layer; and sending the third layer obtained after packing processing to the second electronic device.

18. The device according to claim 17, wherein the at least one processor is configured to further execute the program instructions to perform:

sending, based on a transmission control protocol (TCP), the third layer obtained after packing processing to the second electronic device.

19. The device according to claim 17, wherein the at least one processor is configured to further execute the program instructions to perform:

sending, based on a user datagram protocol (UDP), the third layer obtained after packing processing to the second electronic device.

20. The device according to claim 14, wherein the at least one processor is configured to execute the program instructions to perform:

determining whether a virtual screen creation process and an encoder creation process are invoked; and when it is determined that the virtual screen creation process and the encoder creation process are invoked, determining that the first electronic device is in the casting state.

* * * * *